March 29, 1960     F. M. MAYES     2,930,131
TANK GAUGE

Filed May 4, 1955     2 Sheets-Sheet 1

INVENTOR.
FRED M. MAYES
BY
ATTORNEYS

March 29, 1960

F. M. MAYES 2,930,131

TANK GAUGE

Filed May 4, 1955

INVENTOR.
FRED M. MAYES
BY
ATTORNEYS

United States Patent Office 2,930,131
Patented Mar. 29, 1960

2,930,131

TANK GAUGE

Fred M. Mayes, Newtown Square, Pa., assignor to Sun Oil Company, Philadelphia, Pa., a corporation of New Jersey Application May 4, 1955, Serial No. 506,056

2 Claims. (Cl. 33—126)

This invention relates to tank gauges and particularly to means operating automatically to transmit tank gauge readings to a remote recording or reading location.

In my application Serial No. 493,367, filed March 10, 1955, there are disclosed gauges applicable to the gauging of tanks containing liquids of many types and, in particular, adapted to the gauging of tanks containing petroleum products which will be hereafter generically referred to as "oil." The gauging of oil tanks is of primary economic interest and is particularly illustrative of the numerous problems which arise in this practice.

In accordance with the disclosure of said application, gauging of different types of tanks may be effected with remote transmission of data in such fashion that the transmission is unaffected by variations in transmitting cables or in other associated apparatus.

In accordance with one modification shown in said application, gauging is effected by providing a float at a liquid surface associated with a coded tape which is maintained under constant tension so that as the liquid level rises or falls the float approximately maintains the same relationship to the liquid. For the purpose of transmitting gauging data, the float is raised through the tape by mechanism supported by a counterbalanced beam and, as the raising continues, coded signals are emitted identifying the portion of the tape passing scanning means. As the float continues to rise, its buoyed weight ultimately trips the beam giving rise to a signal which in connection with the transmitted coding is indicative of a predetermined relationship between the float and the liquid surface. The level of the liquid thus becomes determinable and to a high degree of accuracy, for example, of the order of one-eighth inch, even though the range of liquid level to be measured may be very great.

An arrangement of this sort or some equivalent thereof, as disclosed in said application, is highly satisfactory where the nature of the liquid is such as not to affect the effective weight of the float.

However, there are instances where the float may become coated with tarry or other matter from the liquid being gauged. In such case, the effective weight of the float may vary, increasing with accumulation of coating and possibly decreasing if the coating falls off so that the balanced system on tripping is no longer indicative of a particular relationship of the float to the liquid surface.

Furthermore, if the gauging takes place while the tank is being filled or emptied, or is otherwise subjected to the existence of liquid currents, as by wind in an open tank, the float may be laterally displaced so that the tape is not vertical at the time it is raised with the result that there may be an error, though generally slight, due to the deviation of the tape from the vertical at the time the tension on the tape becomes such that tripping occurs.

It is one object of the present invention to improve the type of gauging disclosed in said prior application to render the gauging essentially independent of these factors of possible increase of effective weight of the float and of lateral deviation of the tape. In accordance with the present invention, the improvement is effected by providing means continuously responsive to increase of tension on the supporting tape of a float as the float is raised or decrease of tension as the float is lowered. In an apparatus of the first type, as the float is raised through the liquid surface, the tension on the supporting tape increases until the float leaves the liquid whereupon the tension in the tape becomes constant. At the time at which, or related to which, the tension becomes constant, a signal is emitted which is indicative of the precise time at which the float leaves the liquid. In apparatus of the second type, the tension is constant as the float approaches the liquid moving downwardly and starts to decrease as soon as the float reaches the liquid. A signal emitted when the tension starts to decrease then indicates the time at which the float enters the liquid. The operations involved are obviously not dependent on the effective weight of the float and error due to coating of the float could only possibly be due to a heavy coating on its underside. However, the coatings which occur are never of substantial thickness and this error, in general, is negligible. Even though the thickness of the coating may be small, however, the effective weight of the float may be substantially changed thereby.

Furthermore, the operation is essentially independent of currents which may exist in the liquid. Even if the rise of the float starts with the float in substantially laterally displaced position, as it is raised progressively less and less of the float surface is exposed to the flowing current of liquid and, consequently, the tape becomes progressively closer to vertical position, being substantially vertical at the instant of emergence of the float. Again, therefore, the cessation of increase of tension in the tape marks the complete emergence of the float at a time when the tape is vertical. If the float is lowered into the liquid, independence of currents is also involved.

The attainment of the foregoing objects of the invention and other objects thereof particularly relating to details of construction and operation will become apparent from the following description read in conjunction with the accompanying drawing, in which.

Figure 1:
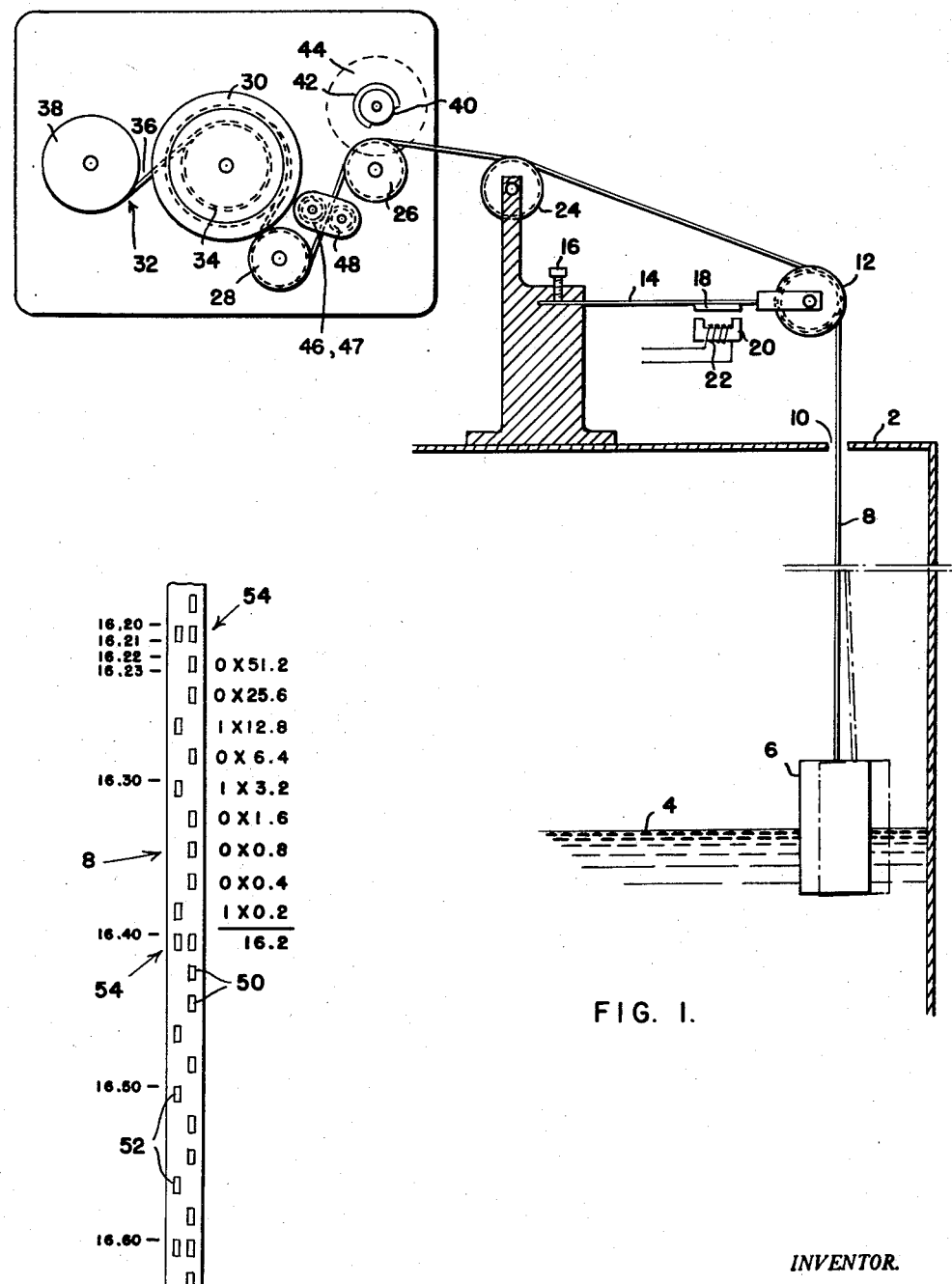
Figure 1 is a diagrammatic and sectional view showing the improved gauging means associated with a tank.

Referring first to Figure 1, there is indicated at 2 the upper portion of a tank containing the liquid 4 which is to be gauged. A float 6, constituting a member subject to buoyancy changes in traversal of a liquid surface, is suspended in the liquid buoyed thereby and subject to constant tension, while the float is stationary, of a tape 8 which extends through an opening 10 in the top of the tank and is trained about a pulley 12 carried by a spring cantilever 14 the end of which is rigidly anchored at 16. The cantilever 14 is desirably relatively stiff and carries at an outer portion thereof subject to substantial deflection an armature member 18 which is associated with a core 20 of an electromagnetic transducer the winding of which is indicated at 22. The armature member 18 and the core 20 are, in all conditions of operation, separated by an air gap which varies with displacement of the spring 14 and, accordingly, with the force exerted on the pulley 12 by the tape 8. The effective inductance of the coil 22 correspondingly changes in approximately linear relationship to the deflection, though such linearity is not essential.

Alternatively, the member 18 may be a magnet variably movable to saturate, more or less, the core 20 thereby giving a variable reactance or, if exciting and secondary windings are used, a variable mutual inductance to produce a signal variable with deflection.

From the pulley 12 the tape 8 extends laterally over a guide roller 24 supported on a fixed axis and thence about a pulley 26 and a pulley 28 to a reel 30 on which the tape is wound. A constant tension spring arrangement tends to impart substantially constant tension to the tape, this arrangement comprising a reel 34 secured to the reel 30, a flat spring 32 and a reel 38 which freely rotates in bearings. Such constant tension spring arrangements are well known. Complete constancy of this tension is not material since all that is required is the maintenance of the tape 8 in normally stretched condition.

Associated with the pulley 26 is a roller 40 which is provided with friction material 42 about its circumference except for an interrupted portion as indicated in Figure 1. A motor 44 is arranged to rotate the roller 40 in clockwise direction during gauging operation to bring the surface 42 into feeding engagement with the tape 8 to raise the float, the float being released when the surface 42 disengages the tape. The motor 44 is of the type incorporating gearing so that the raising of the tape proceeds slowly.

A pair of photoelectric devices 46 and 47 are arranged on one side of the tape in the line of two sets of perforations which will be presently referred to and on the opposite side of the tape there is a lamp 48 to provide illumination. These photoelectric devices may be phototransistors and are used to detect the passage of perforations, constituting markings, in the tape. A generally similar tape handling and reading arrangement is described in said prior application.

As also described in said prior application, the tape 8 may be in the form of a thin flexible steel ribbon which is perforated with rectangular openings as follows:

The openings are provided in two series extending lengthwise of the tape, the openings of the right-hand series being designated 50 and the openings of the left-hand series being designated 52. While, as will be evident, the dimensions may be otherwise, it may be assumed that each of these perforations has a dimension lengthwise of the tape equal to 0.01 foot and that the spacing between adjacent perforations lengthwise of the tape is also 0.01 foot. (It will be noted that 0.01 foot is approximately equal to one-eighth inch, the minimum length desired to be measured.)

Figure 2:
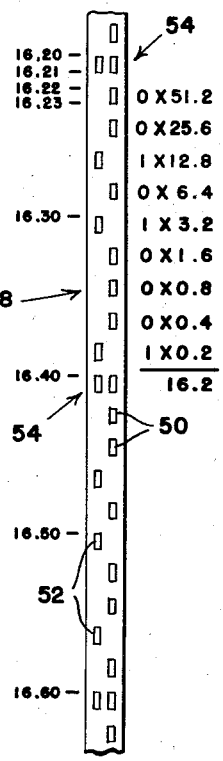
Figure 2 is a fragmentary elevation of a coded tape used in accordance with the invention.

As indicated in Figure 2, there is either a perforation 50 or a perforation 52 centered about each 0.02 foot interval along the length of the tape. At the location of every tenth of said 0.02 foot intervals there appear side by side a pair of perforations 50 and 52 as indicated at 54. Accordingly, at intervals of 0.2 foot, such pairings of the perforations occur. Between these pairs the perforations are either in the group 50 or in the group 52, without pairing.

Disregarding first whether the successive perforations are in the group 50 or 52, it will be evident that the successive beginnings and ends of the perforations measure intervals of 0.01 foot, and assuming that the upper ends of the topmost pair of perforations 54 represent 16.20 feet, it will be evident that successive hundredths of feet will be represented by the locations indicated at the left of Figure 2.

The perforations carry further information serving to identify the particular 0.2 foot intervals represented by the upper ends of the pairs 54. For this purpose, a binary coding system is used which follows the system indicated at the right of Figure 2. Reading upwardly in the group associated with the numbers at the right of Figure 2, the successive unpaired perforations are in positions corresponding to one-tenth of successive powers of 2. Perforations in the right-hand group 50 indicate a zero multiplier, while perforations in the left-hand group 52 indicate a unit multiplier. It will be noted that the binary coding provided below the uppermost pair 54 (which, as stated, marks the length 16.20 feet) sums to 16.2, thereby identifying the length value to be ascribed to the upper ends of the paired perforations just mentioned. Similarly, the perforations below the pair marking the length 16.4 feet are coded in the binary sysem to give the indication 16.4. As will be evident hereafter, the arrangement described thus serves for the indication of every 0.01 foot interval unambiguously. The coding system, as will be evident, is capable of indicating lengths up to 102.4 feet without ambiguity and, of course, even greater lengths may be identified by repetition of the coding, taking into account the fact that there could be readily ascertained the range of approximately 100 feet to which the coding applied.

One of the phototransistors 46 is asociated with the perforations 50 and the other 47 with the perforations 52.

Figure 3:
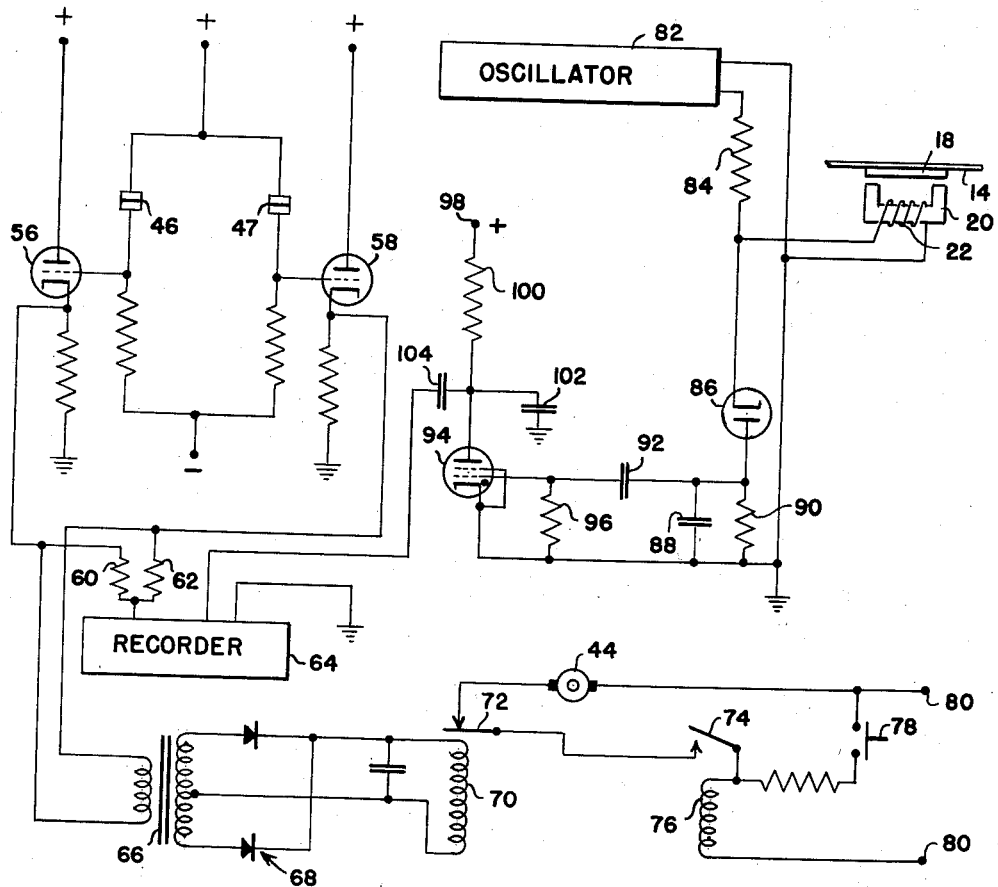
Figure 3 is a wiring diagram of the electrical connections involved.

Referring now to Figure 3, the phototransistors are associated in conventional resistor circuits between potential supply terminals and are connected to the grids of triodes 56 and 58, respectively, in cathode follower arrangements. The outputs from the cathodes of these triodes are arranged to be summed by the resistors 60 and 62 which are connected together and to one stylus-operating coil of recorder 64. Desirably, the resistors 60 and 62 are of different values, assuming that the phototransistors have the same sensitivity and are equally illuminated, so that the particular phototransistor which is emitting a signal may be identified by the amplitude of the recorded deviations.

A transformer 66 having its primary connected between the cathodes of triodes 56 and 58 supplies an input to a rectifier arrangement 68 to provide, as will appear, at proper times a direct current through the relay 70 to open the contact 72. The motor 44 is connected in a circuit which will provide for its starting and continued operation but will serve also to stop the motor at the end of a proper cycle. To this end, alternating current input terminals 80 are connected so that the closure of a push button 78 will energize a holding relay 74, 76 to energize the motor 44, the contact 72 being in series with the motor. The contact 72 is normally closed.

An oscillator 82 provides current at a suitable desirably high frequency through a resistor 84 to the coil 22 of the arrangement associated with beam 14 as previously described. Across the coil 22 there is the series arrangement of a diode 86 and a resistor 90, the latter being shunted by a capacitor 88. The anode of diode 86 is connected through capacitor 92 to the control grid of a thyratron 94, there being a resistor 96 between this grid and ground. The anode of the thyratron 94 is connected through resistor 100 to the positive supply terminal 98 and to ground through capacitor 102. The cathode of the thyratron is grounded. A capacitor 104 couples the anode of thyratron 94 to a stylus-operating coil in the recorder 64, the associated stylus providing a record, as will hereafter appear, alongside the record formed by the stylus receiving the summed outputs from the triodes 56 and 58.

In the operation of what has been described, a momentary closure of the push button 78 will start the motor 44 which will then continue to operate. In this operation, the facing 42 of roller 40 will engage the tape 8 to lift it and the float. If the float has been displaced laterally by some current in the liquid 4, as it is withdraw from the liquid it will move toward its normal position since the resistance offered to the liquid current is lessened. As the float 6 is withdrawn from the liquid surface, the supporting tape 8 will be approximately vertical.

Considering the electrical operations involved, reference may first be made to the circuit of the thyratron 94. The resistor 100 and capacitor 102 and the fixed potentials involved are so chosen that the thyratron is normally pulsing. Under the constant tension spring arrangement, the beam 14 has applied to it a minimum downward force and the armature 18 is consequently spaced to a maximum extent from the core 20. The inductance of coil 22 is then a minimum which means that a minimum current flows through the diode 86 and is constant. The direct potential which appears across capacitor 88 is blocked by capacitor 92 and, consequently, the control grid of the thyratron is at ground potential and pulsing occurs as just stated. Considering now the record 106, the upper graph therein is due to the stylus operated from the inputs provided by the triodes 56 and 58. During the raising of the float, the perforations in the tape in passing the phototransistors will provide signals producing the pulses 108, 110 and 112 on the record. Referring to the fact that resistors 60 and 62 have different values, the perforations at the two sides of the tape will produce pulses of different amplitudes as indicated at 110 and 112 and are, hence, distinguishable. On the other hand, when a pair of pulses such as 54 pass the phototransistors, pulses of still greater amplitude will be produced as indicated at 108. Desirably, the total range of movement of the tape under the action of the facing 42 is such that at least two of the length portions delimited by the paired perforations 54 pass the scanning point with the result that the particular portion of the tape which is being scanned may be determined from the binary coding reproduced on the record. When the roller 40 has moved sufficiently to cause a release of the tape by the facing 42, the float will rapidly drop, correspondingly pulling the tape, and there will be produced a series of rapid pulses indicated at 116. The constants of the circuit are so chosen that no operating direct current is produced through the relay coil 70. However, when the rapid series of pulses indicated at 116 are provided, a substantial direct current flows through the relay 70 sufficient to open the contact at 72, thereby resulting in opening of the contact at 74 and stoppage of the motor 44 until the push button 78 is again momentarily closed.

Figure 4:
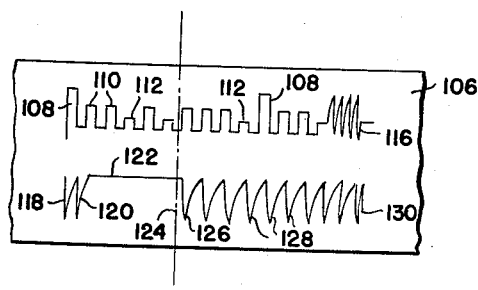
Figure 4 is a fragmentary view of a recorder tape illustrating the type of record made to indicate the level of liquid being gauged.

Consideration may now be given to the lower graph in Figure 4 on the record 106. Before the operation of lifting of the float 6 begins, the pulsing of the thyratron will cause the stylus to move back and forth in accordance with the pulses along the same line 118. As the float 6 is raised out of the liquid, the unbuoyed force applied to the tape 8 continuously increases, producing more and more downward deflection of the beam 14. This, in turn, produces continued approach of the armature 18 to the coil 20 and a corresponding continuous increase in the inductance of coil 22. Consequently, the negative potential of the ungrounded terminal of capacitor 88 increases, and the change of this potential is delivered through capacitor 92 to the grid of the thyratron. The negative potential thus applied to the grid stops the pulsing of the thyratron, and there is indicated at 120 in Figure 4 a final pulse which occurs near the beginning of rise of the float. So long as the float continues to rise, a pulse-inhibiting potential is applied to the control grid of thyratron 94, the potential being generally proportional to the rate of change of tension on the tape 8 reflected in increasing deflection of the beam 14 and increasing inductance of coil 22. Accordingly, the lower graph in Figure 4 has a constant potential-indicating line 122.

Assume, now, that the float 6 leaves the liquid at the time indicated by the construction line 124. After the float leaves the liquid, the tension on tape 8 becomes constant and the deflection of the beam 14 and the inductance of coil 22 likewise become constant. Variation of the potential of the ungrounded terminal of capacitor 88 ceases and no signal is accordingly delivered through the capacitor 92 which rapidly discharges through resistor 96, the control grid of the thyratron resuming ground potential. In the meanwhile, the capacitor 102 will have become charged, and as soon as the potential of the thyratron control grid rises sufficiently, pulsing will be resumed, the occurrence of the first pulse being indicated at 126, with subsequent pulses at 128. The pulse 126 will be slightly delayed beyond the time indicated at 124, but by proper choice of constants this delay may be made quite small, the spacing between 124 and 126 being considerably exaggerated in Figure 4 for purpose of description. If the delay is considered negligible, the pulse 126 will, effectively, indicate the instant at which the float leaves the liquid, or, equivalently, with respect to the pulses in the upper graph in Figure 4, the tape position at which the float leaves the liquid. On the other hand, if the delay between 124 and 126 must be taken into account, the delay is a constant determined by the constants of the circuitry involved, and taking the delay into account, there may be determined the tape position at the time the float leaves the liquid. Actually, of course, this delay may be effectively built into the apparatus merely by suitable displacement of the two styluses lengthwise of the record, so that the instant of occurrence of the first pulse of the thyratron following cessation of pulses may be used to mark the particular tape position at which the float leaves the liquid. If the record 106 comes to rest when the motor 44 stops, the continued pulsing of the thyratron will merely continue to trace the line 130. Of course, the pulsing of the thyratron may also be stopped by opening the direct supply circuit.

It will be evident from what has just been discussed that the instant the float leaves the liquid is determinable entirely independently of the weight of the float. Even though the float may have become coated with tar or some other deposited material, the change in weight will merely change the range of relative movement of the armature 18 with respect to the core 20. So long as the deflection of the beam continues, the pulsing of the thyratron is interrupted. It is only when the rate of change becomes zero that a signal occurs indicative of the withdrawal of the float from the liquid.

The arrangement, furthermore, has the obvious advantage that if the float is displaced from a position corresponding to a vertical condition of tape 8, as it is lifted it will swing more and more toward a vertical position of the tape and the tape will be substantially vertical at the time of emergence of the float since then the drag on the float becomes zero due to currents in the liquid.

It will be evident that the invention may be applied otherwise than as disclosed, involving, for example, the lowering of a float into a liquid, whereupon a constant tension changes to a continuously decreasing tension. In such a case, the production of a signal indicating the initiation of a change of tension may be used as an indication of the instant when the float enters a liquid. Or if the float has a density greater than that of the liquid, there may similarly be an indication, by cessation of change, at the time the top of the float passes downwardly through the surface of the liquid. Or, again, if a sinking float is raised, indication may be given of the emergence of the top of the float from the liquid.

It will, of course, be evident that the coded markings may not be provided on the tape which supports the float but may be provided on an auxiliary drum or other tape moving conjointly with the tape or cable which supports the float. Or the movement of the tape or cable may adjust a pair of potentiometers (for example, one measuring feet and the other fractions of a foot), the change in tension establishing the position at which a signal therefrom is emitted to indicate level. The advantage in such an arrangement is independent of friction of the potentiometer drive. In such an arrangement any usual analog to digital conversion system may be used if desired. Many other modifications will be obvious to those skilled in the art. It will accordingly be understood that the invention is not to be regarded as limited except as required by the following claims.

What is claimed is:

1. Apparatus for gauging liquid level comprising a member subject to buoyancy changes in traversal of a liquid surface, an elongated support attached to said member, means normally maintaining said member and said support in approximately constant relationship with said liquid surface during variations of level of said surface, means for imparting a limited range of vertical movement to said support and member to cause the member to deviate from said approximately constant relationship and to traverse the liquid surface, said limited range of vertical movement being small relatively to the range of liquid level change throughout which said approximately constant relationship is maintained, and means responsive to variations in tension of said support during vertical movements thereof through said limited range to provide an abrupt signal indicative of cessation of variations of said tension.

2. Apparatus for gauging liquid level comprising a member subject to buoyancy changes in traversal of a liquid surface, an elongated support attached to said member, means normally maintaining said member and said support in approximately constant relationship with said liquid surface during variations of level of said surface, means for imparting a limited range of upward vertical movement to said support and member to cause the member to deviate from said approximately constant relationship and to traverse the liquid surface, said limited range of vertical movement being small relative to the range of liquid level change throughout which said approximately constant relationship is maintained, and means responsive to variations in tension of said support during vertical movements thereof through said limited range to provide an abrupt signal when said member leaves the liquid surface.

References Cited in the file of this patent

UNITED STATES PATENTS

| | | |
|---|---|---|
| 1,494,034 | Stevens | May 13, 1924 |
| 2,032,016 | Hitner | Feb. 25, 1936 |
| 2,557,488 | White | June 19, 1951 |
| 2,627,660 | Smith | Feb. 10, 1953 |
| 2,629,261 | McKinney | Feb. 24, 1953 |
| 2,659,072 | Coales et al. | Nov. 10, 1953 |
| 2,672,155 | Caldwell | Mar. 16, 1954 |

FOREIGN PATENTS

| | | |
|---|---|---|
| 1,088,196 | France | Sept. 8, 1954 |